United States Patent
Saitoh et al.

(10) Patent No.: US 7,847,055 B2
(45) Date of Patent: Dec. 7, 2010

(54) POLYPHENYLENE SULFIDE RESIN, PROCESS FOR PRODUCING THE SAME, AND FIBER COMPRISING THE SAME

(75) Inventors: Kei Saitoh, Nagoya (JP); Atsushi Ishio, Nagoya (JP); Takeshi Unohara, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 696 days.

(21) Appl. No.: 11/791,520

(22) PCT Filed: Nov. 22, 2005

(86) PCT No.: PCT/JP2005/021427
§ 371 (c)(1), (2), (4) Date: Oct. 24, 2007

(87) PCT Pub. No.: WO2006/059509
PCT Pub. Date: Jun. 8, 2006

(65) Prior Publication Data
US 2008/0139782 A1    Jun. 12, 2008

(30) Foreign Application Priority Data
Nov. 30, 2004    (JP) .............................. 2004-347913

(51) Int. Cl.
*C08G 75/14* (2006.01)
*C08G 75/00* (2006.01)
*C08G 75/02* (2006.01)

(52) U.S. Cl. .................. 528/381; 528/383; 528/502 R; 528/502 B; 528/503

(58) Field of Classification Search ................. 528/503, 528/381, 383, 502 R, 502 B
See application file for complete search history.

(56) References Cited

U.S. PATENT DOCUMENTS 4,839,411 A    6/1989    Hoover et al.

FOREIGN PATENT DOCUMENTS

| JP | 62-197422 A | 9/1987 |
|---|---|---|
| JP | 63-207827 A | 8/1988 |
| JP | 1-121327 A | 5/1989 |
| JP | 5-043692 A | 2/1993 |
| JP | 6-248078 A | 9/1994 |
| JP | 7-233256 A | 9/1995 |
| JP | 2001-262436 A | 9/2001 |
| JP | 2002-038332 A | 2/2002 |
| JP | 2005-232254 A | 9/2005 |

*Primary Examiner*—Duc Truong
(74) *Attorney, Agent, or Firm*—Morrison & Foerster LLP

(57) ABSTRACT

A polyphenylene sulfide resin treated by thermal oxidation has a generated gas amount of 0.23 wt % or less when the resin is heated and melted in vacuum at 320° C. for 2 hours; a residual amount of 3.0 wt % or less as a residue when the resin is dissolved in an amount corresponding to 20 times the weight of the resin, of 1-chloronaphthalene at 250° C. for 5 minutes and, as the 1-chloronaphthalene solution, pressure-filtered in a still hot state by a PTFE membrane filter with a pore size of 1 μm or less; and a melt flow rate (measured at a temperature of 315.5° C. and at a load of 5000 g according to ASTM D-1238-70) of more than 100 g/10 min to 500 g/10 min.

13 Claims, No Drawings

POLYPHENYLENE SULFIDE RESIN, PROCESS FOR PRODUCING THE SAME, AND FIBER COMPRISING THE SAME

TECHNICAL FIELD

The present invention relates to a granular or pelletized polyphenylene sulfide resin excellent in yarn strength, small in the amount of the volatile component generated during melting and excellent in melt spinnability (namely, small in the number of yarn breaking times per unit time and small in the rise of pack pressure during melt spinning). This invention also relates to a production method thereof and fibers made of a polyphenylene sulfide resin treated by thermal oxidation.

BACKGROUND ART

Polyphenylene sulfide (hereinafter abbreviated as PPS) resins have favorable properties as engineering plastics such as excellent heat resistance, barrier properties, chemicals resistance, electric insulation and wet heat resistance and are processed mainly by injection molding and extrusion molding into various electric and electronic parts, mechanical parts, automobile parts, films, fibers, etc.

However, since PPS resins are high in melting point, high temperatures are necessary for melt-processing them. Therefore, a volatile component is likely to be generated, and, for example, especially in the case where fibers are produced by melt spinning, there arises a problem that the volatile component contaminates the die, to cause yarn breaking. So, it is strongly desired to decrease the volatile component. In this invention, it has been found that thermal oxidation treatment under specific conditions can greatly decrease the volatile component, and a method for obtaining a granular or pelletized PPS resin greatly improved especially in melt spinnability has been found.

The thermal oxidation treatment of PPS resins has been performed hitherto. For example, Patent Document 1 discloses an extrusion molded article obtained by curing a PPS resin for keeping the polymer viscosity in a range from 5000 to 16000 poises (500 to 1600 Pa·s) (310° C., shear rate 200/sec) and keeping the non-Newtonian coefficient n in a range from 1.5 to 2.1, and melt-extruding the cured resin. However, a viscosity of 5000 poises corresponds to less than 100 g/10 min in terms of melt flow rate, and since the PPS resin is too high in melt viscosity, the pressure during spinning is too high. So, such a resin is unsuitable for melt spinning. Further, as disclosed in the patent document, the thermal oxidation treatment degree of the PPS resin is also relatively large, and if the thermal oxidation treatment degree is too large, there arises such a difficulty that a gelation product is likely to be produced for clogging the pack during melt spinning and that the pack pressure is likely to be sharply raised.

Patent Document 2 discloses a method for producing a PPS of 500 g/10 min or less in melt flow rate and 1/2 to 1/30 in the ratio of the melt flow rate after oxidation crosslinking to that before oxidation crosslinking, by oxidizing and crosslinking a PPS of 2000 g/10 min or less in melt flow rate. However, if such a high degree of thermal oxidation treatment as to achieve 1/2 to 1/30 as the ratio of the melt flow rate after oxidation crosslinking to that before oxidation crosslinking is applied, a gelation product is likely to be produced for clogging the pack during melt spinning, and the pack pressure is likely to be sharply raised. So, such a PPS resin is unsuitable for melting spinning, and in fact, Patent Document 2 does not describe the application of the PPS resin to fibers at all.

Patent Document 3 discloses a method for curing a PPS resin by oxidizing and crosslinking a PPS resin with a melt flow rate of 500 g/10 min or less before oxidation crosslinking to reach a melt flow rate of 100 g/10 min or less. However, since the PPS with a melt flow rate of 100 g/10 min or less is too high in melt viscosity, the pressure during spinning is too high. So, the PPS is unsuitable for melt spinning.

Patent Document 4 discloses a method of treating a granular PPS resin with a weight average molecular weight of 30,000 or more and an average particle diameter of 50 μm or less by thermal oxidation. However, as described in Patent Document 4, to obtain a PPS resin with a weight average molecular weight of 30,000 or more and an average particle diameter of 50 μm or less, a special polymerization reactor or grinding is necessary to raise the cost. So, it is not a general method. Further, such fine PPS particles cannot be smoothly fed into the extruder for melt kneading, and the amount of the PPS that can be melt-kneaded and extruded per unit time is small economically disadvantageously.

Patent Document 5 discloses a method for curing a PPS resin in a low oxygen atmosphere, but the melt viscosities of the PPS resins before thermal oxidation treatment disclosed in the examples are very low. Such PPS resins are low in melt spinnability. Even if such a PPS resin is thermally oxidized and crosslinked to be raised in viscosity to a range where melt spinning is possible, a gelation product is likely to be produced for clogging the pack during melt spinning since the thermal oxidation treatment is too strong, and the pack pressure is likely to be sharply raised. Further, high yarn strength cannot be exhibited either. In fact, Patent Document 5 does not describe the application of such a PPS resin to fibers at all.

Patent Document 1: JP63-207827A (claims)
Patent Document 2: JP62-197422A (claims)
Patent Document 3: JP5-43692A (claims)
Patent Document 4: JP6-248078A (claims)
Patent Document 5: JP1-121327A (claims)

SUMMARY OF THE INVENTION

This invention provides a granular or pelletized polyphenylene sulfide resin that generates only small amounts of volatile component during melting and is excellent in physical properties such as yarn strength and melt spinnability (namely, a low number of yarn breaking times per unit time and small in the rise of pack pressure caused by a gelation product during melt spinning). This invention also provides a method for producing such a granular or pelletized polyphenylene sulfide resin and fibers made of a polyphenylene sulfide resin treated by thermal oxidation.

The problem to be solved by the present invention is to obtain a granular or pelletized polyphenylene sulfide resin small in the amount of the volatile component generated during melting and excellent in physical properties such as yarn strength and melt spinnability (namely, small in the number of yarn breaking times per unit time and small in the rise of pack pressure during melt spinning). This invention also relates to a production method thereof and fibers made of a polyphenylene sulfide resin treated by thermal oxidation.

The inventors made a study to solve the aforesaid problem, and as a result, found that if a PPS with a relatively high viscosity is treated by thermal oxidation relatively lightly, a granular or pelletized polyphenylene sulfide resin can be obtained, which is smaller in the amount of the volatile component generated during melting than expected, hence excellent in melt spinnability, is relatively low in the degree of thermal oxidation crosslinking, hence smaller in the amount of the gelation product generated and smaller in the rise of pack pressure otherwise caused by the gelation product during continuous melt spinning, and is also excellent in yarn strength since the viscosity (molecular weight) before thermal oxidation crosslinking is high. Further, they found a production method thereof and also found that fibers composed of a polyphenylene sulfide resin treated by thermal oxidation can be obtained. Thus, this invention has been arrived at.

This invention provides:

(1) A polyphenylene sulfide resin which is treated by thermal oxidation;
having a generated gas amount of 0.23 wt % or less when the resin is heated and melted in vacuum at 320° C. for 2 hours;
having a residual amount of 3.0 wt % or less when the resin is dissolved in an amount corresponding to 20 times the weight of the resin, of 1-chloronaphthalene at 250° C., taking 5 minutes and, as the 1-chloronaphthalene solution, pressure-filtered in a still hot state by a PTFE membrane filter with a pore size of 1 μm or less;
and having a melt flow rate (measured at a temperature of 315.5° C. and at a load of 5000 g according to ASTM D-1238-70) of more than 100 g/10 min to 500 g/10 min.

(2) The polyphenylene sulfide resin described in (1), which is formed as granules or pellets.

(3) A granular polyphenylene sulfide as described in (2), which is a polyphenylene sulfide resin treated by thermal oxidation and has an average particle diameter of 200 μm or more.

(4) A granular polyphenylene sulfide resin as described in (2), which has an L value of 85 to 70 as color tone.

(5) A polyphenylene sulfide resin treated by thermal oxidation, having a melt flow rate of 500 g/10 min or less before the thermal oxidation treatment and having a melt flow rate of more than 100 g/10 min after the thermal oxidation treatment, wherein the difference between the melt flow rate before the thermal oxidation treatment and that after the thermal oxidation treatment is 80 g/10 min or less.

(6) The polyphenylene sulfide resin as described in (5), which is formed as granules or pellets.

(7) The polyphenylene sulfide resin as described in (1) or (5), which is a polyphenylene sulfide resin recovered by flushing.

(8) A polyphenylene sulfide resin fiber comprising the polyphenylene sulfide resin described in (1) or (5).

(9) The polyphenylene sulfide resin fiber as described in (8), which have a yarn strength of 3.0 cN/dtex or more.

(10) A method for producing a polyphenylene sulfide resin treated by thermal oxidation, containing the step of treating a polyphenylene sulfide resin by thermal oxidation, characterized in that the polyphenylene sulfide resin not yet treated by the thermal oxidation has a melt flow rate of 500 g/10 min or less, that the polyphenylene sulfide resin treated by the thermal oxidation has a melt flow rate of more than 100 g/10 min, and that the difference between the melt flow rate before the thermal oxidation treatment and that after the thermal oxidation treatment is 80 g/10 min or less.

(11) The method for producing a polyphenylene sulfide resin as described in (10), wherein said polyphenylene sulfide resin is formed as granules or pellets.

(12) The method for producing a polyphenylene sulfide resin as described in (10), wherein the polyphenylene sulfide resin is a polyphenylene sulfide resin recovered by flushing.

(13) A method for producing a polyphenylene sulfide resin fiber comprising the step of melt-spinning the polyphenylene sulfide resin obtained by the method described in (10).

This invention can provide a granular or pelletized polyphenylene sulfide resin excellent in yarn strength, small in the amount of the volatile component generated during melting and excellent in melt spinnability (namely, small in the number of yarn breaking times per unit time and small in the rise of pack pressure during melt spinning). Further, this invention provides a production method thereof and also fibers made of a polyphenylene sulfide resin treated by thermal oxidation.

DETAILED DESCRIPTION OF THE INVENTION

Modes for carrying out the invention are described below.

(1) PPS Resin

The PPS resin of this invention is a polymer having recurring units, each of which is represented by the following structural formula (1).

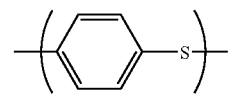

[Chemical formula 1]

In view of heat resistance, it is preferred that the PPS resin is a polymer containing 70 mol % or more of the recurring units, each of which is represented by said structural formula. It is more preferred that the PPS resin is a polymer containing 90 mol % or more of the recurring units. Further, the PPS resin may contain less than about 30 mol % of recurring units, each of which is represented by any of the following structural formulae. It is preferred that the PPS resin of this invention is formed as granules or pellets obtained by melt kneading.

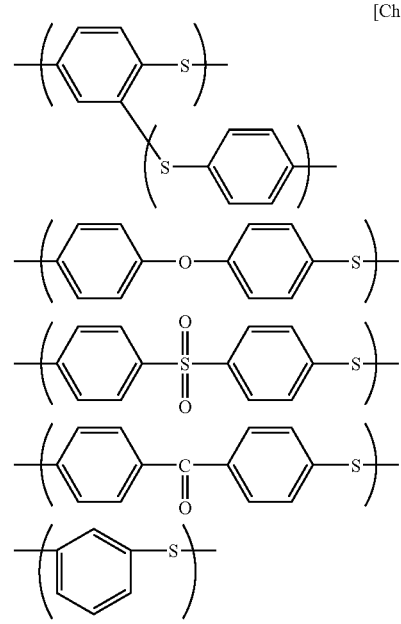

[Chemical formulae 2]

-continued

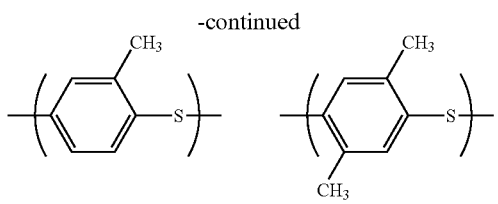

The PPS resin of this invention is characterized by being oxidized and crosslinked by thermal oxidation treatment. It is necessary that the melt flow rate (measured at a temperature of 315.5° C. and at a load of 5000 g according to ASTM D-1238-70) of the PPS resin after the thermal oxidation treatment is more than 100 g/10 min to 500 g/10 min. A preferred range is 110 g/10 min to 400 g/10 min, and a more preferred range is 120 g/10 min to 250 g/10 min. It is not preferred that the melt flow rate after the thermal oxidation treatment is 100 g/10 min or less, since the resin pressure during melt spinning becomes too high. Especially it is not preferred that a high degree of thermal oxidation treatment is performed to lower the melt flow rate into a range of 100 g/10 min or less, since the resin is highly likely to contain such a large amount of a gelation product as to clog the die and the filter during continuous melt spinning, for thereby raising the resin pressure. It is not preferred either that the melt flow rate is in a range of more than 500 g/10 min, since the polymerization degree is so low as to lower the strength of the yarn obtained by melt spinning.

It is preferred that the MFR of the PPS resin used in this invention before the thermal oxidation treatment is 500 g/10 min or less. More preferred is 400 g/10 min or less, and further more preferred is 300 g/10 min or less. Still further more preferred is 250 g/10 min or less. It is not preferred that the MFR before the thermal oxidation treatment is more than 500 g/10 min, since the polymerization degree is so low as to lower the strength of the yarn obtained by melt spinning. It is preferred in view of melt spinnability that the lower limit is in a range of more than 100 g/10 min, and more preferred is 110 g/10 min or more.

It is necessary that when the PPS resin of this invention is heated and melted in vacuum at 320° C. for 2 hours, the amount of the gas volatilized is 0.23 wt % or less. Desirable is 0.18 wt % or less, and more preferred is 0.15 wt % or less. It is not preferred that the amount of the gas generated after the thermal oxidation treatment is more than 0.23 wt %, since the volatile component deposited in the die during continuous melt spinning increases to contaminate the die, for thereby enhancing the likelihood of yarn breaking. The lower limit of the amount of the gas generated after the thermal oxidation treatment is not especially limited, but 0.03% or more is desirable. Preferred is 0.05% or more. If the lower limit of the amount of the gas generated is less than 0.03%, the volatile component deposited in the die during continuous melt spinning decreases and the die is unlikely to be contaminated. However, on the other hand, an amount of less than 0.03% is not preferred, for such reasons that the time taken for the thermal oxidation treatment till the amount of the gas generated becomes small is too long economically disadvantageously, and that the longer time of thermal oxidation treatment is likely to generate the gelation product that clogs the die and the filter for raising the resin pressure during continuous melt spinning.

Meanwhile, said amount of the gas generated means the amount of the adherent component generated by cooling and liquefying or solidifying the gas volatilized when the PPS resin is heated and melted in vacuum, and it can be measured by heating the PPS resin vacuum-sealed in a glass ampoule placed in a tube furnace. The glass ampoule is formed to have a body portion of 100 mm×25 mm and a neck portion of 255 mm×12 mm and has a wall thickness of 1 mm. As the particular measuring method, the body portion only of the glass ampoule with the PPS resin vacuum-sealed in it is inserted into a tube furnace of 320° C. and heated for 2 hours, so that the volatile gas in the neck portion of the ampoule not heated by the tube furnace is cooled and deposited. The neck portion is cut out and weighed, and the gas deposited in it is dissolved and removed into chloroform. Then, the neck portion is dried and weighed again. The amount of the gas generated can be estimated from the weight difference between the ampoule neck portion measured before removing the gas and that measured after removing the gas.

It is necessary that the PPS resin of this invention can leave only an amount of 3.0 wt % or less as a residue when the resin is dissolved in an amount corresponding to 20 times the weight of the resin, of 1-chloronaphthalene at 250° C., taking 5 minutes and, as the 1-chloronaphthalene solution, pressure-filtered in a still hot state by a PTFE membrane filter with a pore size of 1 μm or less. A preferred remaining amount is 2.8 wt % or less, and more preferred is 2.5 wt % or less. A remaining amount of more than 3.0 wt % is not preferred, since it means that the gelation product generated during continuous melt spinning increases to such a level as to clog the die and the filter, for thereby raising the resin pressure. The lower limit of the remaining amount is not especially limited, but it is desired that the lower limit is 1.5% or more. Preferred is 1.7% or more. If the remaining amount is less than 1.5%, the amount of the gelation product generated during continuous melt spinning decreases, and the rise of the resin pressure due to the clogging of the die and the filter is unlikely to occur. However, on the other hand, since the degree of thermal oxidation crosslinking is too low, the volatile component during melting does not decrease so much, and the die contamination during melt spinning and the yarn breaking caused by it may be likely to occur.

Meanwhile, said remaining amount is measured by using a film formed by pressing the PPS resin to a thickness of about 80 μm as a sample, and also using a high temperature filter and a SUS test tube with a pneumatic cap and a collection funnel. Particularly at first a membrane filter with a pore size of 1 μm is set in the SUS test tube, and the about 80 μm thick film of the PPS resin and a weighed amount corresponding to 20 times the weight of the PPS resin, of 1-chloroform are hermetically sealed in the test tube. The test tube is set in a high temperature filter of 250° C. and heated and shaken for 5 minutes. Then, an air-containing injector is connected with the pneumatic cap, and the piston of the injector is pressed for filtration by means of air pressure in a still hot state. As the particular method for determining the remaining amount, the remaining amount can be estimated from the weight difference between the membrane filter before filtration and the membrane filter dried at 150° C. in vacuum for 1 hour after filtration.

It is preferred that the granular PPS resin of this invention has an L value of 85 to 70 as color tone. A more preferred range is 80 to 71, and a further more preferred range is 77 to 72. Since thermal oxidation treatment usually causes the PPS resin to be colored for lowering the L value, the degree of thermal oxidation treatment can be judged in reference to the L value. It is not preferred that excessive thermal oxidation treatment is performed, since the gelation product is likely to be generated to clog the die and the filter, for raising the resin pressure during continuous melt spinning. Said range of L value is a range, in which the degree of thermal oxidation treatment is relatively low. However, it is not preferred that the L value is too high, since the degree of thermal oxidation treatment is so low as to lower the effect of removing the volatile component, for causing die contamination and the resultant yarn breaking. Said L value is measured by using a cylindrical glass cell filled with a granular PPS resin as a sample and also using a color computer.

It is preferred that the PPS resin of this invention is treated by thermal oxidation to ensure that the difference between the melt flow rate before the thermal oxidation treatment and that after the thermal oxidation treatment may become 80 g/10 min or less. It is more preferred that the difference is 70 g/10 min or less, and further preferred is 50 g/10 min or less. The difference between the melt flow rate before the thermal oxidation treatment and that after the thermal oxidation treatment being 80 g/10 min or less shows that the degree of thermal oxidation treatment is relatively low. On the other hand, it is not preferred that the degree of thermal oxidation treatment is too low. It is preferred that the lower limit of the difference between the melt flow rate before the thermal oxidation treatment and that after the thermal oxidation treatment is 5 g/10 min or more. A more preferred range is 20 g/10 min or more. The reason is the same as that described for said L value. It can be said that both the difference between the melt flow rate before the thermal oxidation treatment and that after the thermal oxidation treatment and the L value show the degree of thermal oxidation treatment. It is preferred for the PPS resin of this invention that the degree is not too low and not too high.

It is preferred that the average particle diameter of the granular PPS resin of this invention is 200 μm or more. A more preferred range is 250 μm or more. Meanwhile, the average particle diameter refers to the particle diameter (D50) corresponding to 50% of the integral distribution obtained by using the sieve analysis method. In this invention, as described before, it is desirable to use a PPS not yet treated by thermal oxidation and having a relatively high polymerization degree of 500 g/10 min or less as MFR. However, the production of a PPS with such a relatively high polymerization degree and with an extremely small average particle diameter needs a special polymerization reactor or grinding and is costly, as described for the prior art. So, this is not a preferred method. Further, such fine PPS particles cannot be smoothly fed into the extruder for melt kneading, and the amount of the PPS that can be melt-kneaded and extruded per unit time is small economically disadvantageously. The upper limit of the average particle diameter is not especially limited, but is preferably 750 μm or less, more preferably 600 μm or less. If it is tried to obtain a PPS with a particle diameter of 750 μm or more by an ordinary method, it is necessary to gradually cool the polymerization system after completion of polymerization process. However, this means a longer polymerization time, and it is economically advantageous to cool quickly if possible or to recover by the flushing method described later.

Meanwhile, for obtaining the effects of this invention, it is most preferred to use the PPS resin of this invention 100% for obtaining fibers or any other molded article, but as required, the PPS resin may also be blended with another PPS resin not satisfying the aforesaid conditions. The blending ratio can be selected as required. For example, the amount of the PPS of this invention blended can be 75 to 25% (for example, 75%, 50% or 25%).

A method for producing the PPS resin not yet treated by thermal oxidation (hereinafter called "the non-treated PPS resin") as the raw material of the PPS resin of this invention is described below in detail, but the method for producing the non-treated PPS resin is not of course limited to the following if the requirements specified in this invention are satisfied.

At first, the polyhalogenated aromatic compound, sulfidizing agent, polymerization solvent, molecular weight modifier, polymerization aid and polymerization stabilizer used in the method for producing the non-treated PPS resin are described below.

[Polyhalogenated Aromatic Compound]

The polyhalogenated aromatic compound used in this invention refers to a compound having two or more halogen atoms per molecule. Examples of the polyhalogenated aromatic compound include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diodobenzene, 1-methyl-2,5-dichlorobenzene, etc. It is preferred to use p-dichlorobenzene. Further, two or more polyhalogenated aromatic compounds can also be combined for use as a copolymer, but it is preferred that a p-dihalogenated aromatic compound is a main component.

In view of obtaining a PPS resin with a viscosity suitable for processing, the amount of the polyhalogenated aromatic compound used is 0.9 to 2.0 moles for each mole of the sulfidizing agent. A preferred range is 0.95 to 1.5 moles, and a more preferred range is 1.005 to 1.2 moles.

[Sulfidizing Agent]

The sulfidizing agent used in this invention can be an alkali metal sulfide, alkali metal hydrosulfide, or hydrogen sulfide.

Examples of the alkali metal sulfide include lithium sulfide, sodium sulfide, potassium sulfide, rubidium sulfide, cesium sulfide and mixtures consisting of two or more of the foregoing. Among them, sodium sulfide can be preferably used. Any of these alkali metal sulfides can be used as a hydrate, aqueous mixture or anhydride.

Examples of the alkali metal hydrosulfide include sodium hydrosulfide, potassiumhydrosulfide, lithiumhydrosulfide, rubidium hydrosulfide, cesium hydrosulfide and mixtures consisting of two or more of the foregoing. Among them, sodium hydrosulfide can be preferably used. Any of these alkali metal hydrosulfides can be used as a hydrate, aqueous mixture or anhydride.

Further, a sulfidizing agent prepared from an alkali metal hydrosulfide and an alkali metal hydroxide in situ in a reaction system can also be used. Furthermore, a sulfidizing agent can be prepared from an alkali metal hydrosulfide and an alkali metal hydroxide and transferred into a polymerization vessel, for being used.

Moreover, a sulfidizing agent prepared from an alkali metal hydroxide such as lithium hydroxide or sodium hydroxide and hydrogen sulfide in situ in a reaction system can also be used. Furthermore, a sulfidizing agent can be prepared from an alkali metal hydroxide such as lithium hydroxide or sodium hydroxide and hydrogen sulfide and transferred into a polymerization vessel, for being used.

In this invention, with regard to the amount of the sulfidizing agent added, in the case where the sulfidizing agent is partially lost due to dehydration operation or the like before start of polymerization reaction, the amount added means the amount obtained by subtracting the loss from the actually added amount.

Meanwhile, an alkali metal hydroxide and/or an alkaline earth metal hydroxide can also be used together with the sulfidizing agent. Preferred examples of the alkali metal hydroxide include sodium hydroxide, potassium hydroxide, lithium hydroxide, rubidium hydroxide, cesium hydroxide and mixtures consisting of two or more of the foregoing. Examples of the alkaline earth metal hydroxide include calcium hydroxide, strontium hydroxide, barium hydroxide, etc., and among them, sodium hydroxide can be preferably used.

In the case where an alkali metal hydrosulfide is used as the sulfidizing agent, it is especially preferred that an alkali metal hydroxide is used simultaneously. However, the amount of the alkali metal hydroxide used should be 0.95 to 1.20 moles for each mole of the alkali metal hydrosulfide. A preferred range is 1.00 to 1.15 moles, and a more preferred range is 1.005 to 1.100 moles.

[Polymerization Solvent]

In this invention, an organic polar solvent is used as the polymerization solvent. Examples of it include N-alkylpyrrolidones such as N-methyl-2-pyrrolidone and N-ethyl-2-pyrrolidone, caprolactams such as N-methyl-ε-caprolactam, aprotic organic solvents typified by 1,3-dimethyl-2-imidazolidinone, N,N-dimethylacetamide, N,N-dimethylformamide, hexamethyl phosphoric acid triamide, dimethylsulfone, tetramethylene sulfoxide, etc., mixtures thereof, etc. Any of them can be preferably used, since they are high in reaction stability. Among them, especially N-methyl-2-pyrrolidone (hereinafter this compound may be abbreviated as NMP) can be preferably used.

The amount of the organic polar solvent used is 2.0 to 10 moles for each mole of the sulfidizing agent. A preferred range is 2.25 to 6.0 moles, and a more preferred range is 2.5 to 5.5 moles.

[Molecular Weight Modifier]

In this invention, for forming the ends of the non-treated PPS resin produced or for adjusting the polymerization reaction or molecular weight, a monohalogen compound (not necessarily an aromatic compound) can be used together with said polyhalogenated aromatic compound.

[Polymerization Aid]

In this invention, it is one of preferred modes to use a polymerization aid for obtaining the non-treated PPS resin with a relatively high polymerization degree in a shorter period of time. The polymerization aid means a substance with an action to increase the viscosity of the polyarylene sulfide resin obtained. Examples of the polymerization aid include organic carboxylates, water, alkali metal chlorides, organic sulfonates, alkali metal sulfates, alkaline earth metal oxides, alkali metal phosphates, alkaline earth metal phosphates, etc. Any one of them can be used alone, or two or more of them can also be used simultaneously. Among them, an organic carboxylate and/or water can be preferably used.

Any of said alkali metal carboxylates is a compound represented by general formula R(COOM)n (where R is an alkyl group with 1 to 20 carbon atoms, cycloalkyl group, aryl group, alkylaryl group or arylalkyl group; M is an alkali metal selected from lithium, sodium, potassium, rubidium and cesium; and n is an integer of 1 to 3). The alkali metal carboxylate can also be used as a hydrate, anhydride or aqueous solution. Examples of the alkali metal carboxylate include lithium acetate, sodium acetate, potassium acetate, sodium propionate, lithium valerate, sodium benzoate, sodium phenylacetate, potassium p-toluylate, mixtures thereof, etc.

Any of the alkali metal carboxylates can also be formed by adding about an equal chemical equivalent each of an organic acid and one or more compounds selected from the group consisting of alkali metal hydroxides, alkali metal carbonates and alkali metal bicarbonates, for letting them react with each other. Among said alkali metal carboxylates, a lithium carboxylate can be highly dissolved in the reaction system, to show a high aid effect but is expensive. Potassium, rubidium and cesium carboxylates are considered to be only insufficiently dissolvable in the reaction system. So, inexpensive sodium acetate moderately soluble in the polymerization system can be most preferably used.

In the case where any of these polymerization aids is used, the amount of it is usually in a range from 0.01 to 0.7 mole for each mole of the supplied alkali metal sulfide. A preferred range for obtaining a higher polymerization degree is 0.1 to 0.6 mole, and a more preferred range is 0.2 to 0.5 mole.

Further, using water as a polymerization aid is one of effective means for obtaining a resin composition highly balanced between flowability and high toughness. The amount added in this case is usually in a range from 0.5 to 15 moles for each mole of the supplied alkali metal sulfide. A preferred range for obtaining a higher polymerization degree is 0.6 to 10 moles, and a more preferred range is 1 to 5 moles.

The time when any of these polymerization aids is added is not especially specified. It can be added at any time during the pre-polymerization step described later, at the start of polymerization or during polymerization. It can also be added plural times. However, in the case where an alkali metal carboxylate is used as the polymerization aid, it is preferred to add at a time at the start of pre-polymerization step or at the start of polymerization, since the addition is easy. Further, in the case where water is used as a polymerization aid, it is effective to add during polymerization reaction after supplying the polyhalogenated aromatic compound.

[Polymerization Stabilizer]

In this invention, for stabilizing the polymerization system and for preventing side reactions, a polymerization stabilizer can also be used. The polymerization stabilizer contributes to the stabilization of the polymerization reaction system and inhibits unwanted side reactions. One of the side reactions is the production of thiophenol, and if a polymerization stabilizer is added, the production of thiophenol can be inhibited. Examples of the polymerization stabilizer include such compounds as alkali metal hydroxides, alkali metal carbonates, alkaline earth metal hydroxides and alkaline earth metal carbonates. Among them, alkali metal hydroxides such as sodium hydroxide, potassium hydroxide and lithium hydroxide are preferred. Since said alkali metal carboxylates can also act as polymerization stabilizers, they are included in the polymerization stabilizers that can be used in this invention. Further, in the case where an alkali metal hydrosulfide is used as the sulfidizing agent, it is especially preferred to use an alkali metal hydroxide simultaneously as described before, and if an excessive amount of an alkali metal hydroxide is added for the sulfidizing agent, it can also act as a polymerization stabilizer.

Any one of these polymerization stabilizers can be used alone or two or more of them can also be used in combination. The amount of the polymerization stabilizer is usually 0.02 to 0.2 mole for each mole of the supplied alkali metal sulfide. A preferred range is 0.03 to 0.1 mole, and a more preferred range is 0.04 to 0.09 mole. If the amount of the polymerization stabilizer is too small, the stabilization effect is insufficient. If it is too large on the contrary, economical disadvantage is incurred, and the polymer yield tends to decline.

The time when the polymerization stabilizer is added is not especially specified, and it can be added at any time during the pre-polymerization step described later, at the start of polymerization or during polymerization. It can also be added plural times. However, it is more preferred to add at a time at the start of pre-polymerization step or at the start of polymerization, since the addition is easy.

Next the method for producing the non-treated PPS resin of this invention is described below particularly in the order of pre-polymerization step, polymerization reaction step, recovery step and post-treatment step.

[Pre-Polymerization Step]

In the method for producing the PPS resin used in this invention, the sulfidizing agent is usually used as a hydrate, but it is preferred to heat the mixture containing the organic polar solvent and the sulfidizing agent for removing the excessive amount of water outside the system before the polyhalogenated aromatic compound is added. Meanwhile, if water is removed excessively by this operation, it is preferred to add water for compensating for the shortage.

Further, as described before, an alkali metal sulfide prepared from an alkali metal hydrosulfide and an alkali metal hydroxide in situ in the reaction system or prepared in a vessel different from the polymerization vessel can also be used as the sulfidizing agent. This method is not especially limited. For example, an alkali metal hydrosulfide and an alkali metal hydroxide are added to an organic polar solvent desirably in an inert gas atmosphere in a temperature range from room temperature to 150° C. or preferably from room temperature to 100° C., and the mixture is heated to at least 150° C. or higher preferably to a range from 180 to 260° C. at atmospheric pressure or reduced pressure, for distilling away water. The polymerization aid can also be added at this stage. Furthermore, for promoting the removal of water by distillation, toluene or the like can also be added to perform the reaction.

It is preferred that the water content in the polymerization system during the polymerization reaction is 0.5 to 10.0 moles for each mole of the supplied sulfidizing agent. The water content in the polymerization system in this case refers to the amount of water obtained by subtracting the amount of water removed outside the polymerization system from the amount of water supplied into the polymerization system. Further, the water supplied can be in any mode of liquid water, aqueous solution, crystal water, etc.

[Polymerization Reaction Step]

In this invention, it is preferred that the sulfidizing agent and the polyhalogenated aromatic compound are made to react with each other in the organic polar solvent in a temperature range from 200° C. to lower than 290° C., for producing a granular PPS resin.

For starting the polymerization reaction step, the sulfidizing agent and the polyhalogenated aromatic compound are added to the organic polar solvent desirably in an inert gas atmosphere in a temperature range from room temperature to 220° C., preferably 100 to 220° C. The polymerization aid can also be added at this stage. The order of adding these raw materials can be at random or simultaneously.

The mixture is usually heated to a range from 200° C. to 290° C. The heating rate is not especially limited, but is usually selected in a range from 0.01 to 5° C./min. A preferred range is 0.1 to 3° C./min.

In general, the mixture is heated to a final temperature of 250 to 290° C. to perform the reaction at the temperature usually for 0.25 to 50 hours, preferably 0.5 to 20 hours.

A method of performing the reaction, for example, at 200° C. to 260° C. for a certain period of time at the stage before reaching the final temperature and then heating to a temperature of 270 to 290° C. is effective for obtaining a higher polymerization degree. In this case, the reaction time at 200° C. to 260° C. is usually selected in a range from 0.25 hour to 20 hours, preferably 0.25 to 10 hours.

Meanwhile, for obtaining a polymer with a high polymerization degree, it is effective to polymerize at plural stages. For polymerization at plural stages, it is effective to select the point of time when the conversion of the polyhalogenated aromatic compound in the system at 245° C. reaches 40 mol % or more, preferably 60 mol % or more.

Meanwhile, the conversion of the polyhalogenated aromatic compound (abbreviated as PHA here) refers to a value calculated from the following formula. The remaining amount of PHA can be usually obtained by gas chromatography.

(a) In the case where the polyhalogenated aromatic compound is added at an excessive molar ratio to the alkali metal sulfide: Conversion=[Amount of PHA supplied (moles)−Remaining amount of PHA (moles)]/[Amount of PHA supplied (moles)−Excessive amount of PHA (moles)]

(b) In the other case than said (a) Conversion=[Amount of PHA supplied (moles)−Remaining amount of PHA (moles)]/[Amount of PHA supplied (moles)]

[Recovery Step]

In the method for producing the non-treated PPS resin of this invention, a solid is recovered from the polymerization reaction product containing the polymer, solvent, etc. after completion of polymerization.

It is most preferred to recover the non-treated PPS resin of this invention under quick cooling conditions. The most preferred recovery method under such conditions is flushing. The flushing refers to flushing the polymerization reaction product from a state of high temperature and high pressure (usually 250° C. or higher and 8 kg/cm$^2$ or higher) into an atmosphere of atmospheric pressure or reduced pressure, for recovering the polymer as granules simultaneously with the recovery of the solvent. The flushing in this case means to jet the polymerization reaction product from a nozzle. The atmosphere into which the reaction product is flushed is particularly, for example, nitrogen or water vapor of atmospheric pressure, and the temperature is usually selected in a range from 150° C. to 250° C.

The flushing is an economically excellent recovery method, for such reasons that the solid can be recovered simultaneously with the recovery of the solvent and that the recovery time can also be relatively short. According to this recovery method, ionic compounds typified by Na and organic low polymerization degree product (oligomer) tend to be incorporated into the polymer in the process of solidification.

However, the recovery method of this invention is not limited to the flushing method. If the requirements of this invention are satisfied, a quenching method in which the granular polymer is recovered after gradual cooling can also be employed. However, in view of economy and performance, it is preferred to use the polymer recovered by the flushing method as the non-treated PPS resin of this invention.

[Post-Treatment Step]

The non-treated PPS resin of this invention produced after undergoing the polymerization step and the recovery step can also be treated with an acid, treated with hot water or washed with an organic solvent.

If the acid treatment is employed, it can be performed as follows. The acid used for the acid treatment of the PPS resin in this invention is not especially limited, if it does not act to decompose the PPS resin. Examples of it include acetic acid, hydrochloric acid, sulfuric acid, phosphoric acid, silicic acid, carbonic acid, propylic acid, etc. Among them, acetic acid and hydrochloric acid can be more preferably used. An acid capable of decomposing or deteriorating the PPS resin, such as nitric acid, is not preferred.

The acid treatment can be performed, for example, by a method of immersing the PPS resin in an acid or an acid aqueous solution, and as required, stirring or heating can also be used. For example, in the case where acetic acid is used, if the PPS resin is immersed in an aqueous solution of pH 4 heated to a temperature of 80 to 200° C. and stirred for 30 minutes, a sufficient effect can be obtained. After completion of treatment, the pH can also be 4 or more, for example, about 4 to about 8. It is preferred to wash the PPS resin treated with an acid using cold or hot water several times to remove the remaining acid, salt, etc. It is preferred that the water used for washing is distilled water or deionized water, since the preferred effect of chemically modifying the PPS resin by acid treatment is not impaired.

If the hot water treatment is employed, it can be performed as follows. When the hot water treatment is applied to the granular PPS resin used in this invention, the hot water temperature is 100° C. or higher. More preferred is 120° C. or higher, and further more preferred is 150° C. or higher. Especially preferred is 170° C. or higher. It is not preferred that the temperature is lower than 100° C., since the preferred effect of chemically modifying the PPS resin is small.

For exhibiting the preferred effect of chemically modifying the PPS resin by the hot water washing of this invention, it is preferred that the water used is distilled water or deionized water. The operation of hot water treatment is not especially limited, and a method in which a predetermined amount of the PPS resin is added into a predetermined amount of water, being followed by heating and stirring in a pressure vessel, or a method in which hot water treatment is applied continuously, etc. can be employed. As for the ratio of the PPS resin and water, it is preferred that the amount of water is larger. Usually a bath ratio of 200 g or less of the PPS resin for 1 liter of water is selected.

Further, since the decomposition of end groups is not preferred, it is desirable that the treatment atmosphere is an inert atmosphere for avoiding it. Furthermore, it is preferred that the PPS resin treated with hot water is washed with hot water several times for removing the remaining components.

If an organic solvent is used for washing, it can be performed as follows. The organic solvent used for washing the PPS resin in this invention is not especially limited, if it does not act to decompose the PPS resin, etc. Examples of the organic solvent include nitrogen-containing polar solvents such as N-methyl-2-pyrrolidone, dimethylformamide, dimethylacetamide, 1,3-dimethylimidazolidinone, hexamethyl phosphorus amide and piperazinones, sulfoxide/sulfone solvents such as dimethyl sulfoxide, dimethylsulfone and sulfolane, ketone solvents such as acetone, methyl ethyl ketone, diethyl ketone and acetophenone, ether solvents such as dimethyl ether, dipropyl ether, dioxane and tetrahydrofuran, halogen solvents such as chloroform, methylene chloride, trichloroethylene, dichloroethylene, perchloroethylene, monochloroethane, dichloroethane, tetrachloroethane, perchloroethane and chlorobenzene, alcohol/phenol solvents such as methanol, ethanol, propanol, butanol, pentanol, ethylene glycol, propylene glycol, phenol, cresol, polyethylene glycol and polypropylene glycol, aromatic hydrocarbon solvents such as benzene, toluene and xylene. Among these organic solvents, it is especially preferred to use N-methyl-2-pyrrolidone, acetone, dimethylformamide, chloroform, etc. Further, one of these organic solvents can be used, or two or more of them can also be used as a mixture.

The method for washing with an organic solvent can be, for example, immersing the PPS resin into the organic solvent, and as required, stirring or heating can also be used. When the PPS resin is washed in the organic solvent, the washing temperature is not especially limited, and any desired temperature can be selected in a range from room temperature to about 300° C. If the washing temperature is higher, the washing efficiency tends to be higher, but usually at a washing temperature of room temperature to 150° C., a sufficient effect can be obtained. Washing can also be performed at a temperature higher than the boiling point of the organic solvent under pressurization in a pressure vessel. Further, the washing time is not especially limited either. In the case of batch washing, though depending on washing conditions, washing for more than 5 minutes can usually provide a sufficient effect. Continuous washing can also be employed.

The acid treatment, hot water treatment and washing with an organic solvent can also be used in adequate combination.

If the non-treated PPS resin obtained by the above-mentioned production method is heated in oxygen atmosphere or heated after adding a peroxide such as $H_2O_2$ or a vulcanizing agent such as S, as thermal oxidation treatment, the PPS resin of this invention can be obtained. However, in view of treatment simplicity, the thermal oxidation treatment method of heating in oxygen atmosphere is especially preferred.

The heater for thermal oxidation treatment can be an ordinary hot air dryer, or a rotary heater or a heater with stirring blades. However, in the case where efficient and more homogeneous treatment is intended, it is more preferred to use a rotary heater or a heater with stirring blades. It is desirable that the oxygen concentration for thermal oxidation treatment is 2 vol % or more. More desirable is 8 vol % or more. The upper limit of the oxygen concentration is not especially limited, but about 50 vol % is a limit. More preferred is 25 vol % or less. It is preferred that the temperature of thermal oxidation treatment is 150 to 260° C. A more preferred range is 160 to 250° C., and a further more preferred range is 180 to 220° C. The treatment time is 0.5 to 100 hours. A more preferred range is 0.5 to 50 hours, and a further more preferred range is 1 to 20 hours. A preferred treatment time is such as to satisfy the range of the difference (80 g/10 min or less) between the melt flow rate of the PPS resin not yet treated by thermal oxidation and that of the PPS resin treated by thermal oxidation, specified in this invention. As a more particular treatment time, it is preferred that the time is 0.5 hour or more in the case where the temperature of thermal oxidation treatment is 150° C. to lower than 180° C., that the time is 0.5 hour to less than 20 hours in the case where the temperature of thermal oxidation treatment is 180° C. to lower than 220° C., and that the time is 15 hours or less in the case where the temperature of thermal oxidation treatment is 220° C. to 260° C. Also in these cases, similarly a preferred treatment time is such as to satisfy the range of the difference (80 g/10 min or less) between the melt flow rate of the PPS resin not yet treated by thermal oxidation and that of the PPS resin treated by thermal oxidation, specified in this invention.

Further, dry heat treatment can also be performed before or after the thermal oxidation treatment for the purposes of inhibiting the thermal oxidation crosslinking and removing the volatile content and water content. It is preferred that the temperature is 130 to 250° C. A more preferred range is 160 to 250° C. Further, it is desirable that the oxygen concentration in this case is less than 2 vol %. It is preferred that the treatment time is 0.5 to 50 hours. A more preferred range is 1 to 20 hours, and a further more preferred range is 1 to 10 hours. The heater can be an ordinary hot air dryer, or a rotary heater or a heater with stirring blades. In the case where efficient and more homogeneous treatment is intended, it is more preferred to use a rotary heater or a heater with stirring blades.

The PPS resin of this invention obtained as described above is excellent in heat resistance, chemicals resistance, flame retardancy, electric properties and mechanical properties, and can be especially applied also to injection molding, etc. It can be especially preferably applied to melt spinning.

Meanwhile, another resin can also be added to the PPS resin of this invention to such an extent that the effects of this invention are not impaired. For example, if a small amount of a highly flexible thermoplastic resin is added, the PPS resin can be further improved in flexibility and impact resistance. It is not preferred that the amount is more than 50 wt % based on the weight the entire composition, since the features peculiar to the PPS resin are impaired. It is especially preferred to add 30 wt % or less. Examples of the thermoplastic resin include epoxy group-containing olefin copolymers, other olefin resins, polyamide resins, polybutylene terephthalate resins, polyethylene terephthalate resins, polyphenylene ether resins, polysulfone resins, polyallyl sulfone resins, polyketone resins, polyetherimide resins, polyarylate resins, liquid crystal polymers, polyethersulfone resins, polyetherketone resins, polythioetherketone resins, polyetherketone resins, polyimide resins, polyamideimide resins, polyethylene tetrafluoride resins, etc.

Further, for the purpose of modification, the following compounds can be added as ordinary additives: coupling agents such as isocyanate compounds, organic silane compounds, organic titanate compounds, organic borane compounds and epoxy compounds, plasticizers such as polyalkylene oxide oligomer compounds, thioether compounds, ester compounds and organic phosphorus compounds, crystal nucleating agents such as talc, kaolin, organic phosphorus compounds and polyetheretherketones, metal soaps such as montanic acid, waxes, lithium stearate and aluminum stearate, releasing agents such as ethylenediamine-stearic acid-sebacic acid polycondensation product and silicone compounds, coloration preventives such as hypophosphites, lubricant, ultraviolet light absorber, colorant, foaming agent, etc. It is not preferred that the amount of any of said compounds is more than 20 wt % based on the weight of the entire composition, since the properties peculiar to the PPS resin are impaired. Preferred is 10 wt % or less, and more preferred is 1 wt % or less.

Further, if a coupling agent such as an organic silane is added to the PPS resin of this invention, the strength can also be further enhanced. The amount of the organic silane mixed is 0.1 to 3 parts by weight per 100 parts by weight of the granular PPS resin. A preferred range is 0.5 to 2.5 parts by weight.

A filler can be mixed with the PPS resin of this invention to such an extent that the effects of this invention are not impaired. Examples of the filler include fibrous fillers such as glass fibers, carbon fibers, potassium titanate whiskers, zinc oxide whiskers, calcium carbonate whiskers, wollastonite whiskers, aluminum borate whiskers, aramid fibers, alumina fibers, silicon carbide fibers, ceramic fibers, asbestos fibers, gypsum fibers and metallic fibers, and non-fibrous fillers, for example, silicates such as talc, wollastonite, zeolite, sericite, mica, kaolin, clay, pyrophyllite, bentonite, asbestos and alumina silicate, metal compounds such as silicon oxide, magnesium oxide, alumina, zirconium oxide, titanium oxide and iron oxide, carbonates such as calcium carbonate, magnesium carbonate and dolomite, sulfates such as calcium sulfate and barium sulfate, hydroxides such as calcium hydroxide, magnesium hydroxide and aluminum hydroxide, glass beads, glass flakes, glass powder, ceramic beads, carbon nanotubes, fullerene, boron nitride, silicon carbide, carbon black, silica, graphite, etc. They can also be hollow. Two or more of the fillers can also be used together. Further, any of these fillers can also be preliminarily treated by a coupling agent such as an isocyanate compound, organic silane compound, organic titanate compound, organic borane compound or epoxy compound, for use as a filler.

In the case where fibers are obtained in this invention, it is preferred that said PPS resin is melt-spun as a raw material. However, before the PPS resin is melt-spun, it is desirable that the granular PPS resin of this invention is once pelletized and subsequently melt-spun. Further, also in the case where the granular PPS resin of this invention is used for any other application than fibers, it is preferred to once pelletize the granular PPS resin.

As a typical kneading method, the PPS resin is supplied into a publicly known ordinary melt kneading machine such as a single screw or double screw extruder, Banbury mixer, kneader or mixing roll mill and kneaded at a processing temperature of the melting peak temperature of the PPS resin +5 to 60° C. When subsidiary raw materials are used, the order for mixing the raw materials is not especially limited, and any of the following methods can be used: a method in which all the raw materials are mixed and melt-kneaded by the above-mentioned method; a method in which some raw materials are mixed and melt-kneaded by the above-mentioned method, and the remaining raw materials are mixed and melt-kneaded; a method in which some raw materials are mixed and while the mixture is melt-kneaded by a single screw or double screw extruder, the remaining raw materials are mixed using a side feeder. Further, with regard to small amounts of additives, after the other ingredients are kneaded and pelletized by the above-mentioned method, etc., the small amounts of additives can be added before molding, of course.

In this invention, it is preferred that before the PPS resin is melt-spun, the granular PPS resin or the melt-kneaded and pelletized PPS resin is sufficiently dried at atmospheric pressure, preferably under reduced pressure. It is especially desirable to dry under reduced pressure, before the PPS resin is melt-spun. The drying conditions under such reduced pressure are not especially limited, but the PPS resin is dried usually in a range of 130 to 200° C. for 1 to 10 hours.

Next, for forming fibers, an ordinary spinning machine can be used for melt spinning to obtain the intended polyphenylene sulfide resin fibers (hereinafter called the PPS resin fibers). In the spinning step, for preventing the gelation caused by extra thickening, the PPS resin is heated to a sufficient level for melting at a temperature as low as possible preferably in nitrogen atmosphere and discharged from the die. A typical heating temperature is in a range from 290 to 370° C., and the die is a die used for ordinary melt spinning. For example, a die with a diameter of 0.15 to 0.5 mm and a depth of about 0.2 to about 2.0 mm can be preferably used.

Filaments are usually obtained by taking up after spinning. The take-up speed is not especially limited but is usually in a range from 500 m/min to 7000 m/min. The fibers are cooled while they are taken up, but typically cooling air with a velocity of 5 to 200 m/min (air cooled to or below room temperature) is used, and the fibers are taken up by a predetermined take-up device.

In the stretching step, preferably the fibers are stretched in a bath or on a hot plate or a hot roller at a stretching temperature of about 130° C. to about 170° C. and at a stretching ratio of 2.0 times to 5.0 times.

The said spinning step and stretching step can also be continuous or discontinuous. Further, the fibers can be multifilament fibers or monofilament fibers or staple fibers. Among them, this invention can be used especially suitably for staple fibers.

Especially in the case where staple fibers are obtained, as required, the stretched fibers are crimped by a stuffing box type crimper, and the crimped fibers are heat-treated with relaxation at a predetermined temperature. Then, an oil is applied, and the fibers are cut at a predetermined length, to obtain staple fibers.

The properties of the obtained yarns are not especially limited. Usually it is preferred that the single yarn fineness is 1.5 to 10.0 dtex.

Further, if the PPS resin of this invention is melt-spun, fibers with a strength of 2.0 cN/dtex or more can be obtained. It is preferred that the PPS resin fibers of this invention have a strength of 3.0 cN/dtex or more. More preferred is 3.1 cN/dtex or more. The upper limit of the strength is not especially limited, but usually it is 5.0 cN/dtex.

It is preferred that the elongation is 10 to 100%. A more preferred range is 30 to 80%, and a further more preferred range is 40 to 70%.

Meanwhile, the said strength and elongation are obtained as described below. The filaments obtained by melt-spinning at a spinning temperature of 320° C., at a discharge rate of 350 g/min and at a take-up speed of 1000 m/min are bundled into 130,000 dtex and stretched in a bath with a stretching temperature of 98° C. at a stretching ratio of 3.0 times, crimped by a stuffing box type crimper, heat-treated with relaxation at a temperature of 140° C., and cut at 51 mm by an EC cutter, to obtain staple fibers with a fineness of 2.5 dtex. The strength and elongation of the fibers are measured according to JIS L-1015 8-7-1.

Further, the PPS resin fibers of this invention can have a property of about 0.0 to about 20.0% in dry heat shrinkage percentage.

The fibers obtained in this invention can be suitably used for various applications such as paper making dryer canvases, net conveyors, bag filters and motor binding yarns, etc. Further, the PPS resin of this invention can of course be used for other applications than fibers, for example, injection molded articles, films, sheets, etc.

EXAMPLES

This invention is described below more particularly in reference to examples.

In the following examples, material properties were measured according to the following methods.

[Amount of Gas Generated] A glass ampoule formed to have a body portion of 100 mm×25 mm and a neck portion of 255 mm×12 mm and having a wall thickness of 1 mm was charged with 3 g of a weighed PPS resin and sealed in vacuum. The body portion only of the glass ampoule was inserted into a ceramic electric tube furnace, ARF-30K produced by Asahi Rika Seisakusho, and heated at 320° C. for 2 hours. The ampoule was taken out, and the ampoule neck portion not heated by the tube furnace and having a volatile gas deposited was cut out using a file and weighed. Then, the deposited gas was dissolved and removed using 5 g of chloroform, and the neck portion was dried in a glass dryer of 60° C. for 1 hour and weighed again. The amount of the gas generated was estimated from the weight difference between the ampoule neck portion with the gas and that without the gas.

[Remaining Amount] A PTFE membrane filter with a pore size of 1 µm weighed beforehand was set in a SUS test tube produced by Senshu Scientific Co., Ltd. with a pneumatic cap and a collection funnel, and the test tube was charged with 100 mg of a weighed PPS resin pressed into an about 80 µm thick film and 2 g of weighed 1-chloronaphthalene, and hermetically sealed. The test tube was inserted into a high temperature filter, SSC-9300 produced by Senshu Scientific Co., Ltd. and heated and shaken at 250° C. for 5 minutes, for dissolving the PPS resin into 1-chloronaphthalene. An air-containing 20 mL injector was connected with the pneumatic cap, and a piston was extruded to filter the solution by the membrane filter. The membrane filter was taken out and dried in vacuum at 150° C. for 1 hour, then being weighed. The remaining amount was estimated from the weights of the membrane filter before and after filtration.

[MFR] MFR was measured at a measuring temperature of 315.5° C. and at a load of 5000 g according to the method of ASTM-D1238-70.

[Average Particle Diameter] The particle diameter (D50) corresponding to 50% of the integral distribution obtained by using the sieve analysis method.

[L Value] SM-3 Color Computer produced by Suga Test Instruments Co., Ltd. was used to measure the L value of a granular PPS resin. For measurement, a cylindrical glass cell filled with the granular PPS resin was used as a sample.

[Yarn Strength and Elongation]

These were measured according to JIS L-1015-8-7-1.

Reference Example 1

Preparation of PPS-1

An autoclave with a stirrer and a valve at the bottom was charged with 8267.37 g (70.00 moles) of 47.5% sodium hydrosulfide, 2924.98 g (70.20 moles) of 96% sodium hydroxide, 13860.00 g (140.00 moles) of N-methyl-2-pyrrolidone (NMP), 2187.11 g (26.67 moles) of sodium acetate and 10500.00 g of ion exchange water, and while nitrogen was fed at atmospheric pressure, the mixture was heated gradually up to 240° C., taking about 3 hours, to distill away 14743.16 g of water and 280.00 g of NMP. Then, the reaction vessel was cooled to 160° C. The amount of water remaining in the system for each mole of the supplied alkali metal sulfide was 1.08 moles including the water consumed for hydrolysis of NMP. Further, the amount of the hydrogen sulfide scattered was 0.023 mole for each mole of the supplied alkali metal sulfide.

Subsequently 10254.40 g (69.76 moles) of p-dichlorobenzene (p-DCB) and 6451.83 g (65.17 moles) of NMP were added, and the reaction vessel was hermetically sealed under nitrogen gas. With stirring at 240 rpm, the mixture was heated from 200° C. to 250° C. at a rate of 0.8° C./min and kept at 250° C. for 70 minutes. Then, it was heated from 250° C. to 278° C. at a rate of 0.8° C./min and kept at 278° C. for 78 minutes. The ejection valve at the bottom of the autoclave was opened to flush the mixture into a vessel with a stirrer under nitrogen pressure, taking 15 minutes. The mixture was stirred at 250° C. for a while, to remove most of NMP.

The obtained solid and 76 liters of ion exchange water were placed in an autoclave with a stirrer and washed at 70° C. for 30 minutes, then being suction-filtered by a glass filter. Subsequently 76 liters of ion exchange water heated to 70° C. was poured into the glass filter, and the mixture was suction-filtered to obtain a cake.

The obtained cake and 90 liters of ion exchange water were supplied into an autoclave with a stirrer, and the atmosphere in the autoclave was replaced by nitrogen. Then, the mixture was heated up to 192° C. and kept at the temperature for 30 minutes. Subsequently the autoclave was cooled, and the mixture was taken out.

The mixture was suction-filtered by a glass filter, and 76 liters of ion exchange water of 70° C. was poured into the filter. The mixture was suction-filtered to obtain a cake. The obtained cake was dried at 120° C. in a nitrogen stream, to obtain a dry PPS.

The obtained PPS-1 had an MFR of 198 g/10 min and an average particle diameter of 450 µm.

Reference Example 2

Preparation of PPS-2

PPS-2 was prepared as described for Reference Example 1, except that the amount of 96% sodium hydroxide supplied was 2942.92 g (70.63 moles), that the amount of sodium acetate supplied was 1856.32 g (22.64 moles), and that the amount of p-DCB supplied was 10477.48 g (71.28 moles).

The obtained PPS-2 had an MFR of 642 g/10 min and an average particle diameter of 150 µm.

Reference Example 3

Preparation of PPS-3

PPS-3 was prepared as described for Reference example 1, except that the amount of p-DCB supplied was 10324.77 g (70.24 moles).

The obtained PPS-3 had an MFR of 298 g/10 min and an average particle diameter of 300 µm.

Working Example 1

The PPS-1 was melt-kneaded by TEX30 vented double screw extruder produced by The Japan Steel Works, Ltd. with the cylinder temperature set at 290° C. at a screw speed of 160 rpm, and the extruded strands were cut by a strand cutter to obtain pellets. They were treated by thermal oxidation in air at 160° C. for 1 hour, to obtain pellets with a melt flow rate of 187 g/10 min. When the obtained pellets were heated and melted in vacuum at 320° C. for 2 hours, the amount of the gas generated by volatilization was 0.21 wt %. The obtained pellets were dissolved into an amount corresponding to 20 times the weight of the pellets, of 1-chloronaphthalene at 250° C., taking 5 minutes, and the solution was pressure-filtered in a still hot state by a PTFE membrane filter with a pore size of 1 µm, when the remaining amount was 1.69 wt %. The pellets were dried in vacuum at 165° C. for 5 hours and staple fibers were produced as described below. The pellets were molten by a melt spinning equipment and the molten resin was fed through a metering pump and discharged from a die pack at a spinning temperature of 320° C. and at a discharge rate of 350 g/min. The discharged fibers were taken up at a take-up speed of 1000 m/min and used for a spinning test. The yarn breaking frequency during spinning was once/7 hours, and the internal resin pressure of the die pack after 10 hours of spinning rose by 1.1% compared with the initial resin pressure. The obtained fibers were bundled to 130,000 dtex and stretched in a bath with a stretching temperature of 98° C. at a stretching ratio of 3.0 times, crimped by a stuffing box type crimper, heat-treated with relaxation at a temperature of 140° C., and cut at 51 mm using an EC cutter, to obtain staple fibers with a fineness of 2.5 dtex. The staple fibers had a yarn strength of 3.1 cN/dtex and a yarn elongation of 69%.

Working Example 2

The PPS-1 was pelletized as described for Working Example 1. They were treated by thermal oxidation in air at 200° C. for 10 hours, to obtain pellets with a melt flow rate of 169 g/10 min. When the obtained pellets were heated and melted in vacuum at 320° C. for 2 hours, the amount of the gas generated by volatilization was 0.13 wt %. Further, the obtained pellets were dissolved into an amount corresponding to 20 times the weight of the pellets, of 1-chloronaphthalene at 250° C., taking 5 minutes, and the solution was pressure-filtered in a still hot state by a PTFE membrane filter with a pore size of 1 µm, when the remaining amount was 1.92 wt %. The obtained pellets were dried, being followed by spinning, stretching, crimping, heat treatment, cutting and evaluation as described for Working Example 1. The yarn breaking frequency during spinning was once/9 hours, and the internal resin pressure of the die pack after 10 hours of spinning rose by 1.5% compared with the initial resin pressure. The staple fibers had a yarn strength of 3.2 cN/dtex and a yarn elongation of 68%.

Working Example 3

The PPS-1 was treated by thermal oxidation in air at 200° C. for 3 hours, to obtain a granular PPS resin with a melt flow rate of 152 g/10 min. It had an L value of 73 and an average particle diameter of 450 µm. Further, when it was heated and melted in vacuum at 320° C. for 2 hours, the amount of the gas generated by volatilization was 0.12 wt %. Furthermore, it was dissolved into an amount corresponding to 20 times the weight of the resin, of 1-chloronaphthalene at 250° C., taking 5 minutes, and the solution was pressure-filtered in a still hot state by a PTFE membrane filter with a pore size of 1 µm, when the remaining amount was 1.85 wt %. The obtained granular PPS was melt-kneaded by TEX30 vented double screw extruder produced by The Japan Steel Works, Ltd. with the cylinder temperature set at 290° C. at a screw speed of 160 rpm, and the extruded strands were cut by a strand cutter, to obtain pellets. The pelletization speed was 20 kg/hour. The obtained pellets were dried, being followed by spinning, stretching, crimping, heat treatment, cutting and evaluation as described for Working Example 1. The yarn breaking frequency during spinning was once/10 hours, and the internal resin pressure of the die pack after 10 hours of spinning rose by 2% compared with the initial resin pressure. The staple fibers had a yarn strength of 3.4 cN/dtex and a yarn elongation of 65%.

Working Example 4

The PPS-1 was treated by thermal oxidation in air at 200° C. for 2 hours, to obtain a granular PPS resin with a melt flow rate of 161 g/10 min. It had an L value of 75 and an average particle diameter of 450 µm. Further, when it was heated and melted at 320° C. for 2 hours, the amount of the gas generated by volatilization was 0.14 wt %. Furthermore, it was dissolved into an amount corresponding to 20 times the weight of the resin, of 1-chloronaphthalene at 250° C., taking 5 minutes, and the solution was pressure-filtered in a still hot state by a PTFE membrane filter with a pore size of 1 µm, when the remaining amount was 1.71 wt %. The obtained granular PPS was pelletized, being following by drying, spinning, stretching, crimping, heat treatment, cutting and evaluation as described for Working Example 3. The yarn breaking frequency during spinning was once/9 hours, and the internal resin pressure of the die pack rose by 1%. The fibers had a yarn strength of 3.2 cN/dtex and a yarn elongation of 67%.

Working Example 5

The PPS-3 was treated by thermal oxidation in air at 200° C. for 2 hours, to obtain a granular PPS resin with a melt flow rate of 231 g/10 min. It had an L value of 71 and an average particle diameter of 300 μm. Further, when it was heated and melted in vacuum at 320° C. for 2 hours, the amount of the gas generated by volatilization was 0.10 wt %. Furthermore, it was dissolved into an amount corresponding to 20 times the weight of the resin, of 1-chloronaphthalene, and the solution was pressure-filtered in a still hot state by a PTFE membrane filter with a pore size of 1 μm, when the remaining amount was 2.37 wt %. The obtained granular PPS was pelletized, being following by drying, spinning, stretching, crimping, heat treatment, cutting and evaluation as described for Working Example 3. The yarn breaking frequency during spinning was once/9 hours, and the internal resin pressure of the die pack rose to 4%. The fibers had a yarn strength of 3.0 cN/dtex and a yarn elongation of 59%.

Comparative Example 1

The PPS-1 was melt-kneaded and pelletized, but was not treated by thermal oxidation. When the pellets were heated and melted in vacuum at 320° C. for 2 hours, the amount of the gas generated by volatilization was 0.26 wt %. Further, they were dissolved into an amount corresponding to 20 times the weight of the pellets, of 1-chloronaphthalene at 250° C., taking 5 minutes, and the solution was pressure-filtered in a still hot state by a PTFE membrane filter with a pore size of 1 μm, when the remaining amount was 1.42 wt %. The pellets were dried, being following by spinning, stretching, crimping, heat treatment, cutting and evaluation as described for Working Example 1. The yarn breaking frequency during spinning was once/1 hour, and the internal resin pressure of the die pack rose by 1%. The fibers had a yarn strength of 3.0 cN/dtex and a yarn elongation of 72%. Yarn breaking occurred frequently to show poor spinnability.

Comparative Example 2

The PPS-1 (L value 86) was used but was not treated by thermal oxidation. When it was heated and melted in vacuum at 320° C. for 2 hours, the amount of the gas generated by volatilization was 0.28 wt %. Further, it was dissolved into an amount corresponding to 20 times the weight of the resin, of 1-chloronapthalene at 250° C., taking 5 minutes, and the solution was pressure-filtered in a still hot state by a PTFE membrane filter with a pore size of 1 μm, when the remaining amount was 1.35 wt %. The granular PPS was pelletized, being following by drying, spinning, stretching, crimping, heat treatment, cutting and evaluation as described for Working Example 3. The yarn breaking frequency during spinning was once/1 hour, and the internal resin pressure of the die pack rose by 1%. The fibers had a yarn strength of 3.1 cN/dtex and a yarn elongation of 74%. Yarn breaking occurred frequently to show poor spinnability.

Comparative Example 3

The PPS-1 was treated by thermal oxidation in air at 220° C. for 9 hours, to obtain a granular PPS resin with a melt flow rate of 60 g/10 min. It had an L value of 68 and an average particle diameter of 450 μm. Further, when it was heated and melted in vacuum at 320° C. for 2 hours, the amount of the gas generated by volatilization was 0.05 wt %. Furthermore, it was dissolved into an amount corresponding to 20 times the weight of the resin, of 1-chloronaphthalene at 250° C., taking 5 minutes, and the solution was pressure-filtered in a still hot state by a PTFE membrane filter with a pore size of 1 μm, when the remaining amount was 4.21 wt %. The granular PPS was pelletized, being followed by drying, spinning, stretching, crimping, heat treatment, cutting and evaluation as described for Working Example 3. The yarn breaking frequency during spinning was once/7 hours, and the internal resin pressure of the die pack rose by 8%. The fibers had a yarn strength of 3.0 cN/dtex and a yarn elongation of 62%. The internal resin pressure of the die pack rose by especially a high rate to show poor spinnability.

Comparative Example 4

The PPS-2 was treated by thermal oxidation in air at 200° C. for 2 hours, to obtain a granular PPS resin with a melt flow rate of 510 g/10 min. It had an L value of 69 and an average particle diameter of 150 μm. Further, when it was heated and melted in vacuum at 320° C. for 2 hours, the amount of the gas generated by volatilization was 0.13 wt %. Furthermore, it was dissolved into an amount corresponding to 20 times the weight of the resin, of 1-chloronaphthalene at 250° C., taking 5 minutes, and the solution was pressure-filtered in a still hot state by a PTFE membrane filter with a pore size of 1 μm, when the remaining amount was 3.15 wt %. The granular PPS was pelletized, being following by drying, spinning, stretching, crimping, heat treatment, cutting and evaluation as described for Working Example 3. The pelletization speed was 16 kg/hour. The yarn breaking frequency during spinning was once/5 hours, and the internal resin pressure of the die pack rose by 6%. The fibers had a yarn strength of 2.3 cN/dtex and a yarn elongation of 61%. Since the resin could not be smoothly fed into the extruder, the pelletization speed was low. Moreover, yarn breaking occurred frequently, and the internal resin pressure rose by a high rate, to show poor spinnability. Furthermore, the yarn strength was also poor.

Comparative Example 5

The PPS-3 was treated by thermal oxidation in air at 200° C. for 4 hours, to obtain a granular PPS resin with a melt flow rate of 150 g/10 min. It had an L value of 68 and an average particle diameter of 300 μm. Further, when it was heated and melted in vacuum at 320° C. for 2 hours, the amount of the gas generated by volatilization was 0.07 wt %. Furthermore, it was dissolved into an amount corresponding to 20 times the weight of the resin, of 1-chloronaphthalene at 250° C., taking 5 minutes, and the solution was pressure-filtered in a still hot state by a PTFE membrane filter with a pore size of 1 μm, when the remaining amount was 3.93 wt %. The granular PPS was pelletized, being following by drying, spinning, stretching, crimping, heat treatment, cutting and evaluation as described for Working Example 3. The yarn breaking frequency during spinning was once/7 hours, and the internal resin pressure of the die pack rose by 7%. The fibers had a yarn strength of 2.9 cN/dtex and a yarn elongation of 62%. Yarn breaking was likely to occur, and the internal resin pressure rose by an especially high rate, to show poor spinnability.

The invention claimed is:
1. A polyphenylene sulfide resin which is treated by thermal oxidation;
   having a generated gas amount of 0.23 wt % or less when the resin is heated and melted in vacuum at 320° C. for 2 hours;
   having a residual amount of 3.0 wt % or less when the resin is dissolved in an amount corresponding to 20 times the weight of the resin, of 1-chloronaphthalene at 250° C., taking 5 minutes and, as the 1-chloronaphthalene solu- tion, pressure-filtered in a still hot state by a PTFE membrane filter with a pore size of 1 μm or less;

and having a melt flow rate (measured at a temperature of 315.5° C. and at a load of 5000 g according to ASTM D-1238-70) of more than 100 g/10 min to 500 g/10 min.

2. The polyphenylene sulfide resin according to claim 1, which is formed as granules or pellets.

3. The granular polyphenylene sulfide according to claim 2, having an average particle diameter of 200 μm or more.

4. The granular polyphenylene sulfide resin according to claim 2, having an L value of 85 to 70 as color tone.

5. A polyphenylene sulfide resin treated by thermal oxidation, having a melt flow rate of 500 g/10 min or less before the thermal oxidation treatment and having a melt flow rate of more than 100 g/10 min after the thermal oxidation treatment, wherein the difference between the melt flow rate before the thermal oxidation treatment and that after the thermal oxidation treatment is 80 g/10 min or less.

6. The polyphenylene sulfide resin according to claim 5, which is formed as granules or pellets.

7. The polyphenylene sulfide resin according to claim 1 or 5, which is recovered by flushing.

8. A polyphenylene sulfide resin fiber comprising the polyphenylene sulfide resin according to claim 1 or 5.

9. The polyphenylene sulfide fiber according to claim 8, having a yarn strength of 3.0 cN/dtex or more.

10. A method for producing a polyphenylene sulfide resin treated by thermal oxidation, comprising:

providing a polyphenylene sulfide resin not yet treated by the thermal oxidation that has a melt flow rate of 500 g/10 min or less, and treating the polyphenylene sulfide resin by thermal oxidation so that the treated polyphenylene sulfide resin has a melt flow rate of more than 100 g/10 min, a difference between the melt flow rate before the thermal oxidation treatment and that after the thermal oxidation treatment being 80 g/10 min or less.

11. The method for producing a polyphenylene sulfide resin according to claim 10, further comprising forming said polyphenylene sulfide resin as granules or pellets.

12. The method for producing a polyphenylene sulfide resin according to claim 10, further comprising recovering the polyphenylene sulfide resin by flushing.

13. The method for producing a polyphenylene sulfide resin according to claim 10, further comprising melt-spinning the treated polyphenylene sulfide resin to produce a fiber of said polyphenylene sulfide.

* * * * *